(12) United States Patent
Swanson et al.

(10) Patent No.: US 9,878,781 B2
(45) Date of Patent: *Jan. 30, 2018

(54) ACTIVE VIBRATION CONTROL DEVICES, SYSTEMS, AND METHODS

(71) Applicant: LORD Corporation, Cary, NC (US)

(72) Inventors: Doug A. Swanson, Cary, NC (US); Paul R. Black, Fuquay-Varina, NC (US); Jihan Ryu, Seoul (KR); Stephen C. Southward, Blacksburg, VA (US); Doug G. Pedersen, Apex, NC (US)

(73) Assignee: LORD Corporation, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,026

(22) Filed: May 24, 2016

(65) Prior Publication Data
US 2017/0008620 A1 Jan. 12, 2017

Related U.S. Application Data

(63) Continuation of application No. 14/759,132, filed on Jul. 2, 2015.

(51) Int. Cl.
*B64C 27/00* (2006.01)

(52) U.S. Cl.
CPC ...... *B64C 27/001* (2013.01); *B64C 2027/004* (2013.01)

(58) Field of Classification Search
CPC .................. B64C 2027/004; B64C 27/001
See application file for complete search history.

(56) References Cited

U.S. PATENT DOCUMENTS

| 4,953,098 A | 8/1990 | Fischer, Jr. et al. |
| 5,069,071 A * | 12/1991 | McBrie .................. G01H 11/06 73/579 |
| 2010/0003133 A1 | 1/2010 | Welsh |
| 2011/0303784 A1* | 12/2011 | Heverly, II ........... B64C 27/001 244/17.13 |

FOREIGN PATENT DOCUMENTS

| EP | 2 538 109 | 12/2012 |
| WO | 2012/021202 | 2/2012 |

* cited by examiner

*Primary Examiner* — Yuen Wong
(74) *Attorney, Agent, or Firm* — Richard G. Miller

(57) ABSTRACT

Improved active vibration control (AVC) devices, systems, and related methods are provided herein. An AVC device includes a controller adapted to receive real-time aircraft information and adjust at least one control parameter as a function of the real-time aircraft information is provided. An AVC device is adapted to detect changes in real-time aircraft information, as the aircraft moves from a steady state to transient performance, low and high air speeds, or vice versa. An AVC system (e.g., AVCS) includes one or more sensors, one or more actuators, and a controller adapted to receive real-time aircraft information and adjust at least one control parameter. In some aspects, a method of controlling vibration within an aircraft includes receiving vibration information from at least one sensor, receiving real-time aircraft information from an avionics system, adjusting at least one control parameter used in a control algorithm, and generating a force command.

10 Claims, 5 Drawing Sheets

ACTIVE VIBRATION CONTROL DEVICES, SYSTEMS, AND METHODS

CROSS REFERENCE TO RELATED APPLICATION

The present application claims priority to and is a continuation application of U.S. application Ser. No. 14/759,132, filed Jul. 2, 2015; which claims priority and is a 371 application of International Application No. PCT/US2014/011959, filed Jan. 17, 2014; which claims the benefit of U.S. Provisional Patent Application Ser. No. 61/754,191, filed Jan. 18, 2013, all of which are incorporated herein by reference.

TECHNICAL FIELD

The present subject matter relates generally to devices, systems, and methods for controlling vibration. More particularly the present subject matter relates to devices, systems, and related methods for actively controlling vibration, for example particularly in aircraft, such as rotary winged aircraft.

BACKGROUND

Various types of aircraft experience vibrations during operation. Such vibrations are particularly troublesome in rotary winged aircraft, such as helicopters, as vibrations transmitted by large rotors can contribute to fatigue and wear on equipment, materials, and occupants within the aircraft. Vibrations can damage the actual structure and components of the aircraft, as well as contents disposed within the aircraft. This increases costs associated with maintaining and providing rotary winged aircraft, such as costs associated with inspecting and replacing parts within the aircraft, which may become damaged during vibration.

Conventional methods of controlling vibration within an aircraft include using passive devices and/or systems, which are tuned relative to the operating frequency of the aircraft rotor. In addition to adding large amounts of weight to the aircraft, passive devices and/or systems are inefficient. More effective methods of controlling vibration within an aircraft include active devices and/or systems, which actively apply a control force to counteract forces imposed by aircraft vibration.

One problem associated with conventional active vibration control devices and/or systems, is that such systems fail to account for different vibration profiles occurring when an aircraft is at steady state versus in transient performance and/or at low and high forward air speeds. That is, currently available active vibration control devices and systems fail to account for changes to other aircraft information, such as forward air speed, rotor speed, altitude, etc., when generating control force commands, as those changes occur in real-time. Currently there is not an active vibration control device, system, or related method providing real-time modification of control parameters based upon real-time aircraft information.

Accordingly, there is a need for improved devices, systems, and methods for actively controlling aircraft vibration as the aircraft moves between transient and steady state conditions in real-time.

SUMMARY

In accordance with the disclosure provided herein, novel and improved active vibration control (AVC) devices, AVC systems (AVCS), and methods are provided. In some aspects, improved AVC devices, systems, and related methods utilize control parameters that are adaptive or adjusted as a function of real-time aircraft information, including information relating to aircraft and/or flight condition(s).

In some aspects, an AVCS includes a controller adapted to receive real-time aircraft information and adjust at least one control parameter as a function of the aircraft information. The AVCS is adapted to detect changes in aircraft information, as the aircraft moves from a steady state to transient performance, low and high forward air speeds, or vice versa. At least one sensor and at least one actuator are provided with the AVCS.

In another aspect, an active vibration control system (AVCS) for use in aircraft is provided. The AVCS comprises a controller, at least one sensor and at least one actuator. The controller is adapted to receive real-time aircraft information and adjust at least one control parameter in the AVCS as a function of the real-time aircraft information, wherein the real-time aircraft information is selected from the group consisting of forward air speed, rotor speed, pitch, yaw, roll, altitude, relative altitude, aircraft weight, weight on wheels, aircraft center of gravity, glass cockpit mode and combinations thereof.

In further aspects, an AVC device includes a first interface for receiving real-time aircraft information directly from an avionics system, and a force command generating module. The force command generating module is configured to adjust at least one control parameter as a function of the real-time aircraft information and generate a force command using the adjusted control parameter. The AVC device further includes a second interface for outputting the force command to one or more actuators.

In some aspects, an AVC system (e.g., AVCS) includes one or more sensors, one or more actuators, and a controller adapted to receive aircraft information and adjust at least one control parameter.

In some aspects, a method of controlling vibration within an aircraft using a vibration controller, the method includes:
  a) receiving vibration information from at least one sensor;
  b) receiving real-time aircraft information from an avionics system;
  c) adjusting at least one control parameter produced by the vibration controller as a function of the real-time aircraft information; and
  d) generating and outputting a force command.

DETAILED DESCRIPTION

Figure 1:
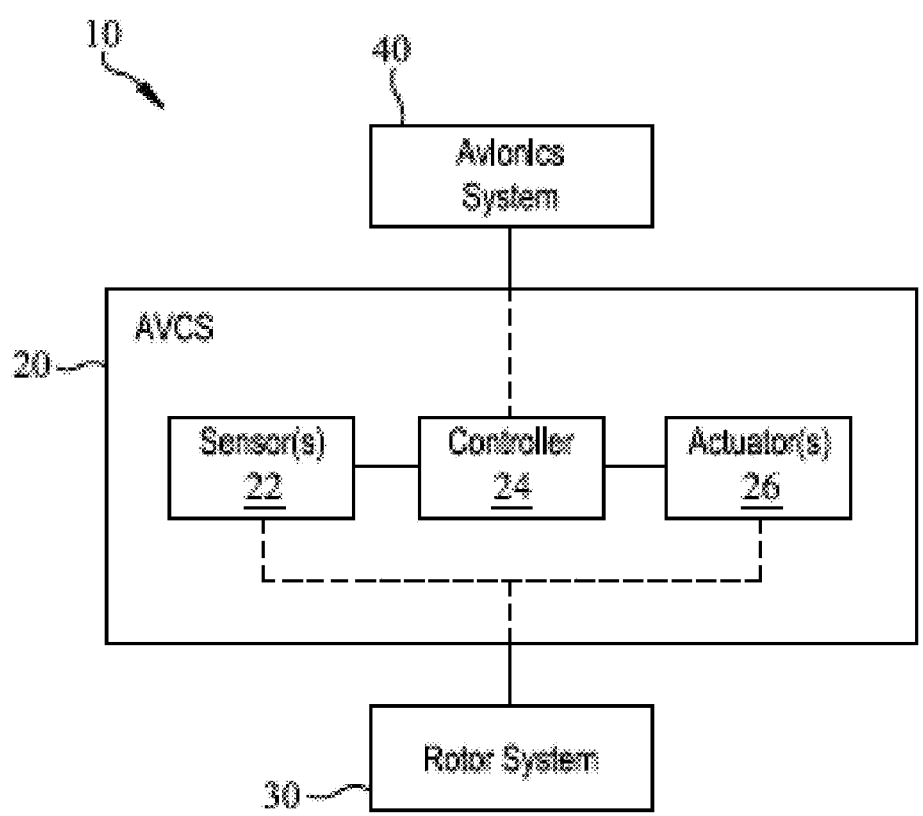
FIG. 1 is a block diagram illustrating an active vibration control (AVC) system (AVCS) according to one aspect of the subject matter described herein.

The subject matter disclosed herein is directed to novel active vibration control (AVC) devices, AVC systems (AVCS), and related methods for use and installation within a rotary wing aircraft. In some embodiments, novel AVC devices and AVCS provided herein include a controller adapted to receive aircraft information and adjust at least one control parameter as a function of the real-time aircraft information. In some aspects, the real-time aircraft information is directly received from a data bus or avionics system. Such information is used to improve the steady state and transient performance of an AVC device or AVCS. In some aspects, changes in real-time aircraft information may indicate transient conditions. The controller is also adapted to detect changes in real-time aircraft information, thereby rapidly adapting vibration control to the flight condition or condition of the aircraft.

In some aspects, the avionics system is configured to collect and communicate real-time aircraft information to the controller via a data bus system described or provided by a standard selected from one of ARINC 429, MIL-STD-1553, or RS422.

In some aspects, real-time aircraft information used by an AVC device or system includes forward air speed, rotor speed, engine torque pitch, yaw, roll, altitude, relative altitude, aircraft weight, weight on wheels, aircraft center of gravity, engine torque, collective, whether an aircraft is operable in glass cockpit mode, acceleration, and/or velocity. In one aspect real-time aircraft information comprises one or more data information inputs, wherein the real-time aircraft information is selected from the group consisting of forward air speed, rotor speed, pitch, yaw, roll, altitude, relative altitude, aircraft weight, weight on wheels, aircraft center of gravity, glass cockpit mode and combinations thereof. This includes the first and/or second derivative of some selected information;

In some aspects, control parameters used in generating a force command are adjusted by the controller as a function of the real-time aircraft information. In some aspects, control parameters include a sensor weighting matrix, an actuator weighting matrix. a parameter of an adaptive vibration controller such as a least mean squared (LMS) control mechanism or algorithm, a parameter of a low-pass filter mechanism, an LMS adaptation rate, an accelerometer demodulation low-pass filter parameter, and/or a band-pass break frequency.

In some aspects, a first type of real-time aircraft information is monitored and/or compared with other types of real-time aircraft information. For example, a controller monitors and/or compares rotor speed, forward air speed, and other information. Active vibration control is implemented with quicker reaction time than already provided for or more slowly than already provided for via the AVCS based upon such information and comparisons thereof. In some aspects, active vibration control is implemented more slowly via the AVCS at higher forward air speeds. In some aspects, active vibration control is implemented more quickly via the AVC system at lower forward air speeds.

FIGS. 1 to 4 illustrate various views and/or features associated with AVC devices, AVCS, and related methods for controlling vibration in aircraft, namely, rotary wing aircraft. In some aspects, AVC systems, devices, and related methods described herein are adapted for use in rotary winged aircraft (i.e., rotorcraft), fixed-wing aircraft, tiltrotor aircraft, as well as hybrid aircraft being part rotorcraft and part road vehicle.

FIG. 1 illustrates an aircraft system 10 for utilizing information obtained from an aircraft avionics system, link, and/or data bus to control vibration imposed by rotors and/or the rotary wing system. Aircraft system 10 includes an AVC system (AVCS) 20 adapted to control vibration imposed by a rotor wing or rotor system 30 using information at least partially received from an aircraft avionics system 40. In some aspects, AVCS 20 is configured to sense, measure, or detect vibrations, receive real-time aircraft information from a data bus, link, or avionics system 40, adjust algorithm control parameters as a function of real-time aircraft information, calculate a force command using the adjusted algorithm parameters, and generate a force that reduces vibrations imposed by rotor system 30, thereby actively counteracting aircraft vibration.

In some aspects, AVCS 20 includes one or more sensors 22, a controller 24, and one or more actuators 26. As indicated in broken lines, sensors 22 of AVCS 20 is adapted to detect or measure vibration imposed upon aircraft components by rotor system 30. Sensors 22 are configured to measure and detect vibration information and send the vibration information obtained from rotor system 30 to controller 24 for use in an algorithm for actively generating a vibration canceling force command. In some aspects, controller 24 processes the vibration data received from sensors 22, modifies the vibration data and/or algorithm parameters via real-time aircraft information received from avionics system 40, and automatically outputs control commands to actuators 26. Actuators 26 may then, in response to receiving the control command, generate a vibration canceling force.

In some aspects, controller 24 includes an algorithm for calculating a vibration canceling force which is adaptive to real-time aircraft information received from avionics system 40 and/or include algorithm control parameters adaptive to real-time aircraft information received from avionics system 40. This advantageously provides improved vibration control at steady state and transient flight conditions, as vibration profiles may vary greatly between such conditions.

In some aspects, sensors 22 include accelerometers configured to measure vibrations of the fuselage, rotors, rotary wings, or structures or portions of the aircraft exhibiting vibrations imposed by rotor system 30. Controller 24 is configured to process the vibration data received from sensors 22 and output force commands or control commands to actuators 26. In some aspects, actuators 26 are configured to generate a vibration canceling force via the force commands output from controller 24. Actuators 26 include any suitable electromechanical device configured to generate forces for canceling vibrations imposed by rotor system 30. In some aspects, actuators 26 include resonant actuators having a natural resonant frequency and a resonant actuator control system with a command input for receiving a force command or command signal from controller 24. In other aspects, actuators 26 include one or more linear actuators, circular actuators (e.g., circular force generator (CFGs)), or hub mounted vibration systems (HMVS). Actuators 26 are disposed or positioned at any suitable location within an aircraft for controlling and/or canceling vibrations. For example, actuators 26 are disposed in and/or attached to portions of the fuselage structure, the fuselage/rotor interface, each rotor blade, combinations thereof, or any other suitable portion or location within the aircraft.

Notably, as indicated in broken lines, controller 24 of AVCS 20 is adapted to receive real-time aircraft information directly from avionics system 40, in addition to vibration data from sensors 22. In some aspects, controller 24 receives real-time aircraft information prior to processing vibration data from sensors 22. In some aspects, controller 24 receives real-time aircraft information prior to generating the force command and outputting the force command signal to actuators 26. Controller 24 is configured to use the real-time aircraft information received from avionics system 40 for improving performance of AVCS 20, as vibration may vary greatly during transition from low to high forward air speeds and between steady state and transient conditions.

Real-time aircraft information received from avionics system 40 is used to adjust controller 24 algorithm parameters and/or weighting matrices used in the control algorithm as a function of real-time aircraft information to improve the steady state and transient performance of AVCS 20. In some aspects, controller 24 is adapted to simultaneously receive both vibration information from sensors 22 and real-time aircraft information from avionics system 40.

In some aspects, avionics system 40 includes a data bus or data link having one or more physical and electrical interfaces. In some aspects, avionics system 40 includes a two-wire data bus and data protocol to support an aircraft's avionics local area network (LAN). In some aspects, avionics system 40 includes an aircraft data bus specified by ARINC 429, MIL-STD-1553, RS422, or any other suitable standard or protocol for aircraft data busses. In some aspects, avionics system 40 is configured to communicate real-time aircraft information directly to controller 24, such information includes forward air speed, rotor speed, engine torque, pitch, yaw, roll, altitude, relative altitude (e.g., height above ground), aircraft weight, weight on wheels, remaining fuel, glass cockpit mode (i.e., the introduction of Flight Management Systems (FMS) to help monitor and control the aircraft), first derivatives thereof, second derivatives thereof, combinations thereof, or any other pertinent information regarding the condition of the aircraft or flight information.

Figure 2:
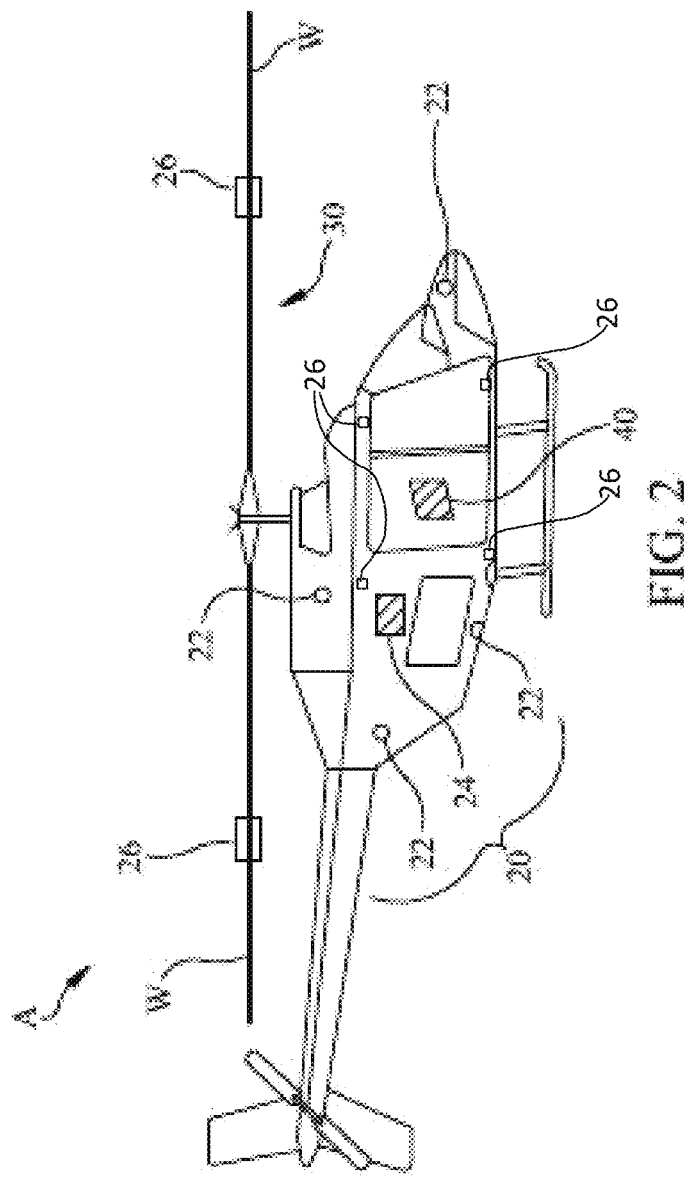
FIG. 2 is a perspective view of a rotary winged aircraft with an AVCS according to one aspect of the subject matter described herein.

Referring now to FIG. 2, one example is provided of an aircraft generally designated A, without limitation. Aircraft A includes an improved AVCS 20 configured to receive real-time aircraft information from avionics system 40, and provide improved vibration control that is more adaptive to aircraft and flight conditions, such as low and high forward air speeds. In some aspects, aircraft A includes one or more fixed or rotary wings W. As noted above, AVCS 20 includes one or more sensors 22, one or more actuators 26, and a controller 24.

AVCS 20 is configured to input real-time aircraft information from an onboard data bus or avionics system 40 and provide an improved, modified, and adaptive force control algorithm for controlling vibration imposed from rotor system 30. In some aspects, real-time aircraft information obtained from avionics system 40 is used to modify weighting matrices and/or other parameters used in the control algorithm. As vibration profiles may vary between low and high forward air speeds, real-time aircraft information such as aircraft forward air speed, maneuver, whether the aircraft is hovering, rotor speed, engine torque, collective, pitch, yaw, roll, altitude, relative altitude, combinations thereof, and/or any other aircraft data transmitted via avionics system 40 are used to determine different parameters used within the force command algorithm for providing improved vibration control within the aircraft, that is more adaptive to the performance state of aircraft A.

Using real-time aircraft information communicated from avionics system 40 for adjusting control algorithm and/or parameters used within control algorithm as a function of real-time aircraft information improves performance at both steady state and transient flight conditions. In some aspects, sensors 22 are placed over different portions of the aircraft fuselage or aircraft wings W. Actuators 26 are disposed in various locations of aircraft A, including for example being disposed over portions of the fuselage, wings (blades) W, and/or rotors of rotor system 30. In some aspects, controller 24 includes a physical device, such as a computer disposed within a portion of the aircraft fuselage. It is contemplated that in some aspects, controller 24 includes multiple computers disposed at various locations within aircraft A. Sensors 22, actuators 26, and avionics system 40 are each in communication with controller 24. In some aspects, data busses, wires, and physical and/or electrical interfaces facilitate communication therebetween.

Figure 3:
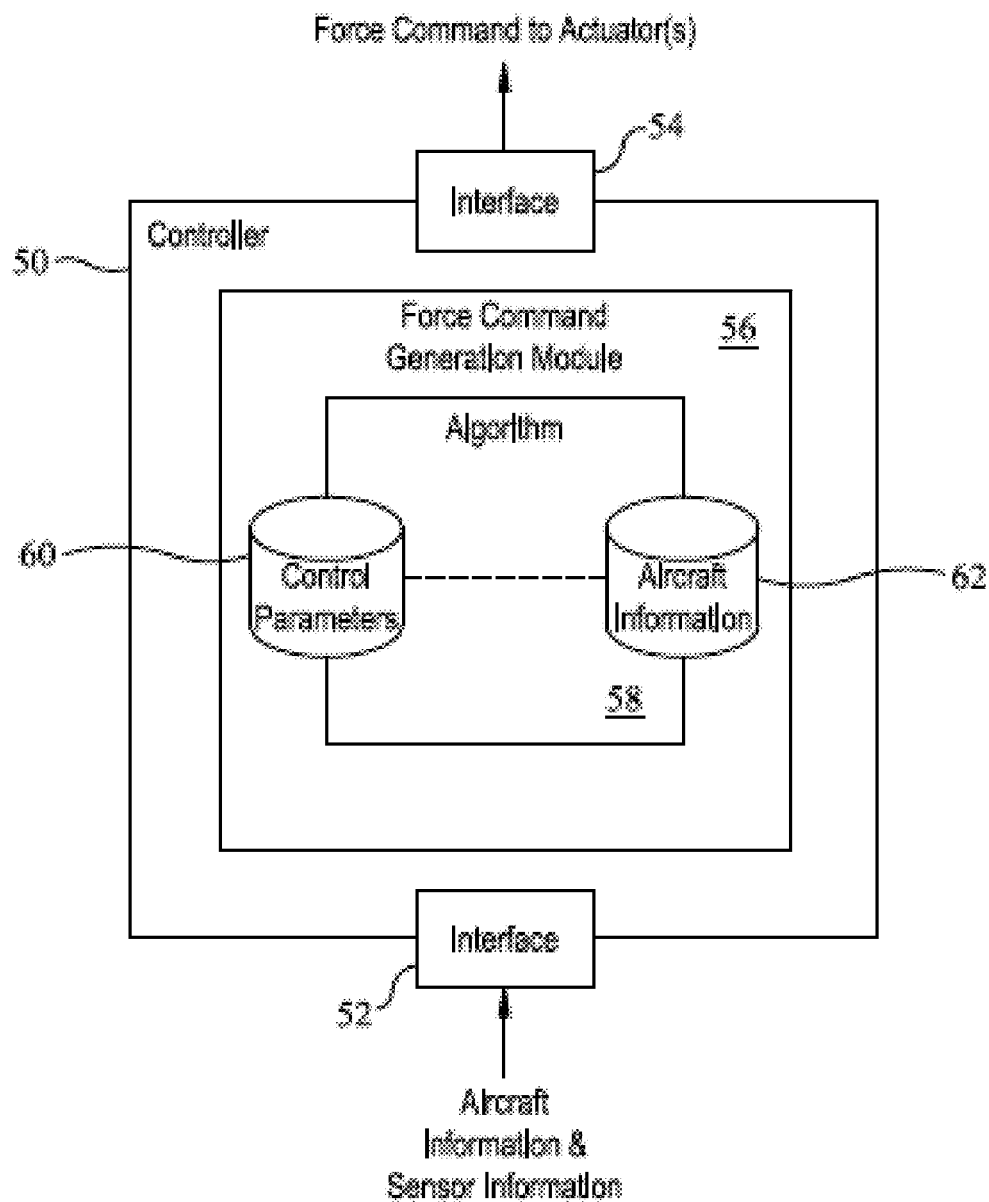
FIG. 3 is a block diagram illustrating an AVC device for an AVCS according to one aspect of the subject matter described herein.

FIG. 3 is one embodiment of an AVC device, such as a controller 50 of an AVCS. Controller includes for example a first interface 52 and a second interface 54. First and second interfaces 52 and 54 include physical and/or electrical interfaces configured for sending and receiving information. In some aspects, first and second interfaces 52 and 54 include signaling interfaces, such as a transmit (Tx) or Receive (Rx) interfaces, which are used for exchanging information. In some aspects, first interface 52 is configured to receive or input vibration information from sensors (e.g., 22, FIG. 1). Notably, first interface 52 is also configured to receive or input real-time aircraft information 62 from an onboard data bus or avionics system (e.g., 40, FIG. 1). Table 1 below contains non-limiting representative examples of real-time aircraft information 62 which may be received individually or in combination from a data bus or avionics system and optionally stored in controller 50. In some aspects, a first and/or a second derivative of the information contained in the table below are received from avionics system. The first or second derivative information can also be calculated in the controller. For example, velocity and acceleration (e.g., first and second derivatives of forward speed) may also be transmitted across first interface 52 to controller 50.

TABLE 1

| Examples of Aircraft Information Receivable from Data Bus or Avionics System |
| --- |
| Forward Air Speed (velocity, acceleration) |
| Rotor Speed |
| Engine Torque |
| Collective |
| Aircraft Center of Gravity |
| Pitch, Yaw, Roll |
| Altitude |
| Relative Altitude (e.g., height above ground) |
| Aircraft Weight |
| Weight on Wheels |
| Glass Cockpit Mode |

Table 1.

The real-time aircraft information 62 above is used to improve the steady state and transient performance of AVCS via adjusting control parameters and/or a control algorithm as a function of real-time aircraft information. In some aspects, controller 50 is adapted to detect changes in real-time aircraft information 62. Thus, controller 50 detects change in transient state as a function of aircraft information 62. Using real-time aircraft information 62 allows controller 50 to provide pre-programmed responses to changes in real-time aircraft information 62, trigger adjustment of control parameters and generate one more force commands, thereby ensuring the controller 50 provides near-instantaneous flight control based upon the flight condition.

In some aspects, controller 50 also includes a force command generation module 56. Force command generation module 56 is configured to receive both sensor and real-time aircraft information and generate a force command. The force command is output to one or more actuators via second interface 54 for generating the vibration canceling force.

In one non-limiting example, force command generation module 56 includes a control algorithm 58. In some aspects, control algorithm 58 includes a least mean square (LMS) algorithm, model, and/or approach to vibration control. However, algorithm 58 is not limited to LMS methodology and other algorithms and/or vibration modeling calculations may be used and provided.

In some aspects, control algorithm 58 processes and uses control parameters 60 and real-time aircraft information 62. Control parameters 60 include parameters used in various algorithm 58 methodologies and/or modeling calculations that may be adapted, tweaked, adjusted, transformed and/or otherwise modified using real-time aircraft information 62 as indicated in broken lines. In some aspects, control parameters 60 includes LMS adaptation rate, LMS leak parameter, LMS sensor weighting matrix, LMS actuator weighting matrix, accelerometer de-modulation band-pass filter frequency bandwidth, accelerometer low pass filter break frequency, combinations thereof, or any other suitable parameter used in any other algorithm(s) and/or model(s) for calculating and generating a force command. In some aspects, one or more control parameters 60 are modified or adjusted as a function of real-time aircraft information 62. For example, Table 2 below contains examples of control parameters 60 used within algorithm 58, which may be adjusted as a function of real-time aircraft information 62.

TABLE 2

Examples of Algorithm Control Parameters
Adjusted as a Function of Real-Time Aircraft Information LMS adaptation rate
Sensor weighting matrix
Force (e.g., actuator effort) weighting matrix
Adaptive algorithm updated parameters
Band-pass break frequencies
Algorithm update low pass filter break frequency
Accelerometer de-modulation low pass filter Table 2.

In some aspects, control parameters 60 are derived from vibration information obtained via sensors (e.g., 22, FIG. 1) and optionally stored in a database for use in algorithm 58. Control parameters 60 may be derived either in real time and/or periodically. Control parameters 60 are modified or adjusted based upon real-time aircraft information 62 directly received from data bus or avionics system (e.g., 40, FIG. 1). Real-time aircraft information 62 is derived from information regarding the aircraft or flight condition, such as the information previously described in Table 1, and optionally stored in a database for use in algorithm 58. In some aspects, control parameters 60 are adjusted in real time or periodically as a function of real-time aircraft information 62. Notably, an AVCS incorporating novel controller 50 is adaptive for reacting quickly to perceived changes in real-time aircraft information, such as when the aircraft is speeding up or slowing down. This improves vibration control as a function of flight condition or aircraft condition, which is derived using real-time aircraft information 62.

In some aspects, real-time aircraft information transmitted and/or communicated to controller 50 via data bus (e.g., avionics system 40, FIG. 1) is collected from and/or linked to a pilot's control stick. That is, as the pilot moves the control stick to speed up, slow down, maneuver, or otherwise change aircraft/flight information, the data bus or avionics system transmits such information immediately and directly to controller 50. Such data is also known as the "collective." Controller 50 then uses such information to automatically adjust control parameters 60 used within algorithm 58 as a function of real-time aircraft information 62. As the aircraft speeds up or slows down, controller 50 reacts more quickly to control vibration levels. Thus, in one aspect real-time aircraft information comprises one or more data information inputs, wherein the real-time aircraft information is selected from the group consisting of forward air speed, collective, engine torque, rotor speed, pitch, yaw, roll, altitude, relative altitude, aircraft weight, weight on wheels, aircraft center of gravity, glass cockpit mode and combinations thereof. This includes the first and/or second derivative of some selected information As noted above, in some aspects algorithm 58 includes an LMS algorithm or methodology utilizing measured vibration from sensors (e.g., 22, FIG. 1). Algorithm 58 is configured to generate force commands communicated to actuators (e.g., 26, FIG. 1). In order to make adjustments to the force command using an LMS algorithm, a finite set of data must first be collected and processed before an adjustment is made. Thus, the LMS algorithm may not respond well to changes in aircraft or flight condition. In order to improve vibration control, control parameters 60 (including weighting matrices used in LMS algorithm) are adjusted or modified as a function of real-time aircraft information 62.

In some aspects, algorithm 58 includes an LMS algorithm minimizing Equation (1), which is a cost function (J) at time step, k:

$$J_k = E_k^H Q E_k + U_k^H R U_k \qquad (1)$$

In Eq. (1) above, $J_k$ is the cost function; $E_k$ is the de-modulated error signal in the frequency domain (e.g., error signal obtained from sensors, such as accelerometers); $E_k^H$ is a Hermitian matrix of $E_k$ (e.g., a complex conjugate transpose of $E_k$); Q is a weighting matrix for the error signal; $U_k$ is the de-modulated actuator signal in the frequency domain; $U_k^H$ is a Hermitian matrix of $U_k$, and R is a weighting matrix on actuator effort (e.g., force). Sensor and actuator weighting may be used with an adaptive vibration control algorithm such as steepest descent principal component or Newton-Raphson algorithm, although not shown.

In some aspects, control parameters 60 include sensor weighting matrix Q and actuator weighting matrix R as well as parameters such as an LMS adaptation rate, leak parameter, accelerometer de-modulation band-pass filter frequency bandwidth, or accelerometer low pass filter break frequency. Control parameters 60 are updated, modified, or adjusted as a function of real-time aircraft information 62, such as aircraft forward air speed. This is advantageous as the nature of helicopter vibration changes as a function of forward speed.

Controller 50 is also adapted to implement a low pass filter. Parameters thereof are also adjustable as a function of real-time aircraft information. In some embodiments, accelerometer de-modulation low pass filter and band-pass break frequencies are adjusted or modified as a function of real-time aircraft information. For example, Equation (2) below is an example of a time domain error signal, where e(t) is an accelerometer time-domain signal.

$$e(t) = (E_C) \cos(2\pi(f)(t)) + (E_S) \sin(2\pi(f)(t)) \qquad (2)$$

Eq. (2) may be de-modulated as follows in Equations (3) and (4), into real and imaginary parts of an accelerometer transfer function at frequency f:

$$E_C + [(E_C) \cos(4\pi(f)(t)) + (E_S) \sin(4\pi(f)(t))] \text{ and;} \qquad (3)$$

$$E_S + [(E_C) \sin(4\pi(f)(t)) + (E_S) \cos(4\pi(f)(t))] \qquad (4)$$

In Eq. (2) to (4) above, e(t) is the accelerometer time-domain signal derived from portions of a tachometer signal, and $E_C$ and $E_S$ are real and imaginary parts, respectively, of the accelerometer transfer function at frequency, f. Accelerometer de-modulation low pass filter and band-pass break frequencies are modified as a function of real-time aircraft information, such as information contained in Table 1, and derivatives thereof. It should be appreciated that other variations of algorithm 58, and not just LMS, may be used and are contemplated herein. Algorithm parameters, variables, or input are adjustable as a function of aircraft/flight information. Although the description herein is shown in a limited number of forms, it is not limited to just these forms but rather is amenable to various changes and modifications without departing from the scope thereof.

Figure 4:
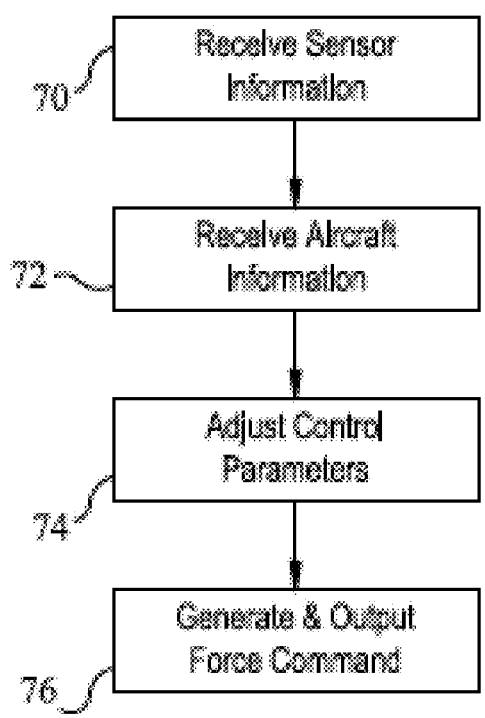
FIG. 4 is a flow chart illustrating exemplary steps for providing active vibration control according to one aspect of the subject matter described herein.

Referring to FIG. 4, a flow chart illustrating, without limitation, exemplary steps for providing active vibration control within an aircraft according to one aspect of the subject matter described herein is illustrated. In some aspects, vibration control is provided by an AVCS having an AVC device, such as a controller. In block 70, sensor information is received. In some aspects, sensor information includes vibration information received from one or more accelerometers and/or information from one or more tachometers. In some aspects and as previously described, AVCS includes a controller adapted to receive sensor information across an interface.

Figure 5:
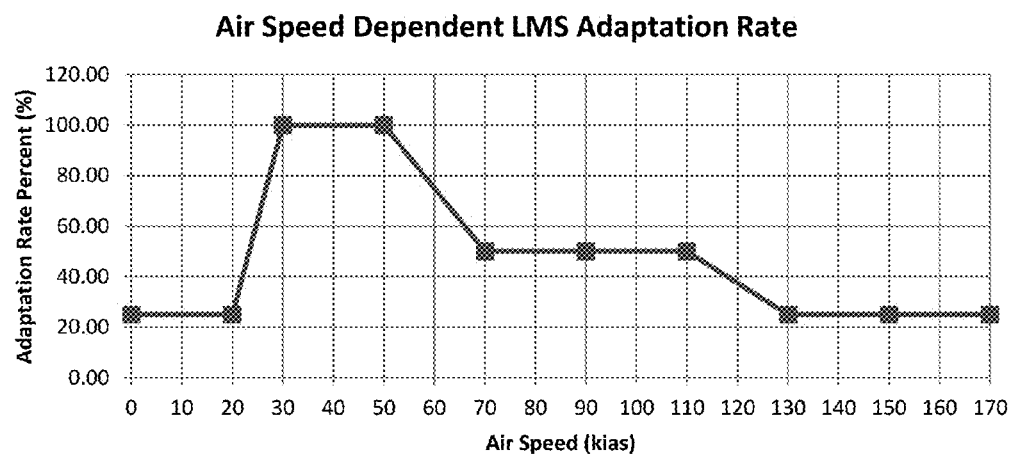
FIG. 5 is an illustrative plot of adaptation rate (convergence speed) versus forward air speed.

In block 72, real-time aircraft information is received. In some aspects and as previously described, AVCS includes a controller adapted to receive real-time aircraft information across an interface. The interface for receiving the sensor information and the real-time aircraft information is the same or different. Sensor information and real-time aircraft information are received in real time, periodically, simultaneously, combinations thereof, and/or at different and mutually exclusive time intervals. In some aspects, real-time aircraft information is communicated from an onboard data bus. In some aspects, controller detects large or small changes in real-time aircraft information, which may be indicative of an aircraft moving between steady state and transient performance. A non-limiting example of the control parameter adjustment is illustrated in FIG. 5 where the adaptation rate versus forward air speed is modeled. In some aspects, the controller is adapted to generate force commands as a function of changes in flight and/or aircraft conditions using real-time aircraft information.

In block 74, control parameters are adjusted. In some aspects, control parameters (e.g., provided in Table 2) are adjusted as a function of real-time aircraft information (e.g., provided in Table 1). In some aspects, adjusting control parameters as a function of real-time aircraft information provides improved vibration control at steady state and transient performance, as control parameters are more indicative of actual aircraft and/or flight condition(s). Control parameters are used in a control algorithm of controller. Control algorithm is configured to calculate a force command communicated to actuators. AVCS includes actuators adapted to receive the force command from controller, and generate a vibration canceling force.

In some aspects, controller uses adjusted control parameters and quickly adapts to flight conditions at low forward air speeds (e.g., <100 knots) when flare and/or other large transients occur. In other aspects, controller uses adjusted control parameters and slowly adapts at high forward air speeds (e.g., >100 knots) for improving steadiness during steady flight conditions. Controller is configured to adapt quickly (e.g., adjust control parameters) where changes in aircraft transients occur. Controller detects such changes using information communicated from avionics system. For example, controller quickly adapts to large changes in forward air speed, engine torque, the collective, altitude, pitch, roll, yaw, combinations thereof, and/or large changes in rotor speed.

In block 76, controller generates a force command and outputs the force command to one or more actuators. Notably, actuators receive control commands calculated and determined using parameters which have been adjusted as a function of flight or aircraft condition. This provides improved vibration control.

In some aspects, the method disclosed in FIG. 4 includes one or more optional steps. For example, in some aspects the controller (e.g., 24 FIG. 1, 50 FIG. 3) may be configured to monitoring one or more types of real-time aircraft information, and implementing AVC via the steps illustrated in FIG. 4 more quickly and/or more slowly in response to the monitored information. In some aspects, a controller monitors real-time aircraft information such as, for example only, forward air speed. As the monitored air speed transitions to lower air speeds (e.g., <100 knots), the AVC device and/or system is adapted to respond and implement AVC per the method disclosed in FIG. 4 more quickly. As the monitored air speed transitions to higher air speeds (e.g., >100 knots), the AVC device and/or system is adapted to respond and implement AVC per the method disclosed in FIG. 4 more slowly. Any type real-time aircraft information other than forward air speed, such as information provided in Table 1 above, may be monitored as described herein and used to implement AVC more quickly or more slowly during transients or transient conditions (e.g., large or small changes to the monitored information). That is, AVC is implemented at various, different time intervals (e.g., more or less slowly/quickly) based upon the monitored real-time aircraft information.

In other aspects, a controller (e.g., 24 FIG. 1, 50 FIG. 3) is configured and adapted to perform the optional steps of monitoring and receiving a first type of real-time aircraft information and comparing that information with at least one other type of real-time aircraft information received from avionics system, or data bus. In some aspects, multiple types of real-time aircraft information are monitored and compared at controller. The AVC device and/or system may then implement AVC based upon the monitored and compared information via the steps illustrated in FIG. 4. For example only and without limitation, in some aspects rotor speed and forward air speed are monitored and compared. AVC per the method disclosed in FIG. 4 is implemented more quickly or more slowly via the AVC device and/or system based upon such information. In some aspects, where the speed of the main rotor changes by a larger amount (e.g., positively or negatively), the AVC device and/or system react quickly and implement AVC more quickly. Where the air speed changes by a large amount (e.g., either positively or negatively), the AVC device and/or system reacts more slowly and implements AVC more slowly. That is, AVC is implemented at various, different time intervals (e.g., more or less slowly/quickly) based upon the monitored and compared information. Any suitable type information other than air speed and rotor speed, such as information provided in Table 1 above, may be monitored and compared as described herein and used to implement AVC more quickly or more slowly during transients (e.g., large or small changes to the monitored and compared information).

Notably, AVC devices and AVCSs, including AVC devices, as described herein, provide adaptive algorithm control parameters, and therefore, adaptive algorithms, which are modified based on a function of aircraft and/or flight information. This improves the steady state and transient performance of the AVCS, as vibration control is adjusted using real-time aircraft information such as forward air speed, altitude, engine torque, rotor speed, etc. Embodiments as disclosed herein may provide one or more of the following beneficial technical effects: reduced cost; reduced weight; improved vibration control during steady state and transient performance using adaptive algorithm and/or adaptive algorithm control parameters which have been adjusted as a function of real-time aircraft information.

While the present subject matter has been has been described herein in reference to specific aspects, features, and illustrative embodiments, it will be appreciated that the utility of the subject matter herein is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter herein as hereinafter claimed is intended to be broadly construed and interpreted, as including all such variations, modifications and alternative embodiments, within its scope and including equivalents of the claims.

What is claimed is:

1. A method of providing active vibration control at steady state and/or transient performance conditions using an active vibration control (AVC) device for an aircraft having real-time aircraft information, the method comprising:
   receiving at a signaling interface of a vibration controller a vibration information from one or more sensors;
   receiving via the signaling interface at the vibration controller a real-time aircraft information from an aircraft avionics system, the vibration controller being adapted to simultaneously receive both the vibration information from the one or more sensors and the real-time aircraft information from the aircraft avionics system;
   adjusting, in real-time at the AVC device, at least one control parameter stored at the vibration controller as a function of the real-time aircraft information, the at least one control parameter selected from the group consisting of a Least Mean Square (LMS) adaptation rate, a sensor weighting matrix, a force weighting matrix, an adaptive algorithm updated parameter, a band-pass break frequency, an algorithm update low pass filter break frequency, an accelerometer de-modulation low pass filter, and combinations thereof;
   generating a vibration canceling force command in response to an electronic force command from the vibration controller, the electronic force command being a result of the adjusting the at least one control parameter; and
   outputting the vibration canceling force command to at least one actuator that is in electronic communication with the vibration controller, to reduce at least one vibration at steady state and transient performance conditions, thereby counteracting aircraft vibration.

2. The method of claim 1, wherein the real-time aircraft information is received from an on board data bus.

3. The method of claim 2, wherein the real-time aircraft information is directly received from the on board data bus.

4. The method of claim 2, wherein the on board data bus is provided by a standard selected from one of ARINC 429, MIL-STD-1553, or RS422.

5. The method of claim 1, further comprising detecting changes in the real-time aircraft information.

6. The method of claim 1, wherein the vibration information is received from one or more accelerometers.

7. The method of claim 1, further comprising outputting the electronic force command to one or more actuators.

8. The method of claim 1, wherein the real-time aircraft information is selected from the group consisting of forward air speed, rotor speed, pitch, yaw, roll, altitude or relative altitude, aircraft weight, weight on wheels, aircraft center of gravity, glass cockpit mode and combinations thereof.

9. The method of claim 1, further comprising monitoring or comparing the real-time aircraft information.

10. The method of claim 1, further comprising implementing the active vibration control at faster or slower time intervals based upon monitoring or comparing the real-time aircraft information.

* * * * *